(12) United States Patent
Treat et al.

(10) Patent No.: US 6,321,939 B1
(45) Date of Patent: Nov. 27, 2001

(54) HIGH STRESS BLAST AERATOR WITH DAMPENDED PISTON

(75) Inventors: Rodney D. Treat; G. Vic Moore, both of Benton, AR (US)

(73) Assignee: Global Mfg. Inc., Little Rock, AR (US)

( * ) Notice: Subject to any disclaimer, the term of this patent is extended or adjusted under 35 U.S.C. 154(b) by 0 days.

(21) Appl. No.: 09/777,127

(22) Filed: Feb. 6, 2001

(51) Int. Cl.⁷ .......................................................... B67D 5/00
(52) U.S. Cl. .................................... 222/2; 222/4; 222/195
(58) Field of Search ............................ 222/2, 3, 4, 195; 251/30.02

(56) References Cited

U.S. PATENT DOCUMENTS

| | | |
|---|---|---|
| 3,788,527 | 1/1974 | Matson . |
| 3,915,339 | 10/1975 | Matson . |
| 3,942,684 | 3/1976 | Stetson . |
| 4,051,982 | 10/1977 | Stetson . |
| 4,197,966 | 4/1980 | Wadenstein . |
| 4,346,822 | 8/1982 | Wadensten . |
| 4,449,644 | 5/1984 | Matson . |
| 4,469,247 | 9/1984 | Tompkins . |
| 4,496,076 | 1/1985 | Tompkins . |
| 4,676,402 | 6/1987 | Stetson . |
| 4,703,869 | 11/1987 | Rody . |
| 4,767,024 | 8/1988 | Rappen . |
| 4,817,821 | 4/1989 | Simoens . |
| 4,826,051 | 5/1989 | Milian . |
| 4,880,147 | 11/1989 | Tolan . |
| 5,143,256 | 9/1992 | Wadensten . |
| 5,441,171 | 8/1995 | Maury . |
| 5,517,898 | 5/1996 | Kim . |
| 5,715,861 | 2/1998 | Williams . |
| 5,762,103 | 6/1998 | Gregoire . |
| 5,853,160 | 12/1998 | Hurdis . |
| 5,957,464 | 9/1999 | Elliott . |

*Primary Examiner*—Philippe Derakshani
*Assistant Examiner*—Thach H. Bui
(74) *Attorney, Agent, or Firm*—Stephen D. Carver

(57) ABSTRACT

Quick acting blast aerators having rigid accumulation tanks with internal valve assemblies comprising a tubular body, an end cap teat receives air through an inlet controlled by solenoids, and an internal piston that contacts a valve seat during filling, and retracts to expose exhaust vents upon firing. The valve calp comprises a ring groove and an O-ring check valve. An internal dampening passageway vertically extends through the cap. Internal air passageways extend form the passageway to the air-control groove, admitting air into the tank by dislodging the O-ring. The high temperature piston slides between a tank-fill position bearing against the valve seat and a retracted position exposing the exhaust vents. An internal return spring extends between a deep, annular recess in the piston, and a groove formed in the bottom of the end cap. A dampener projecting from the piston is received within the passageway traversing the end cap.

37 Claims, 13 Drawing Sheets

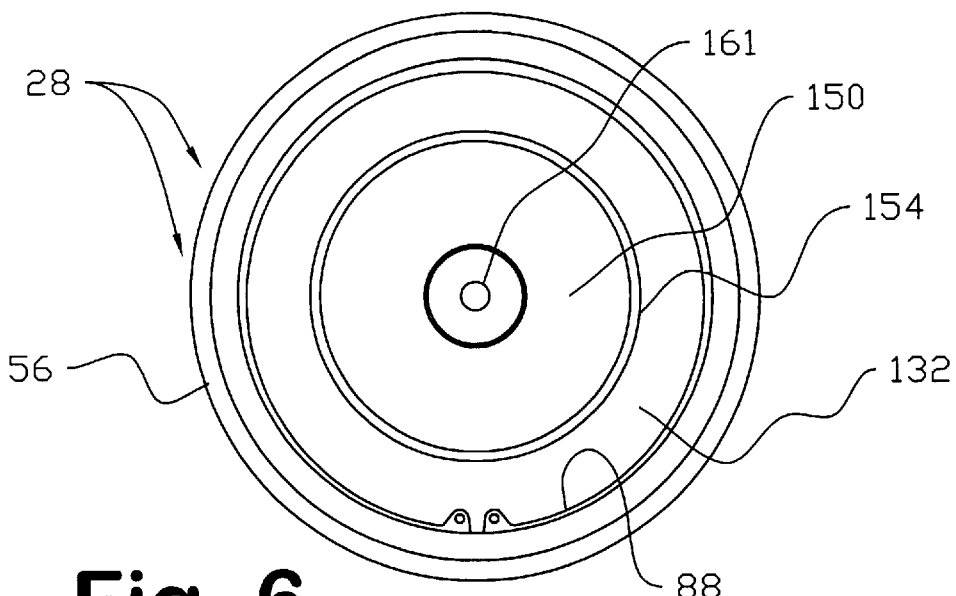
Fig. 6
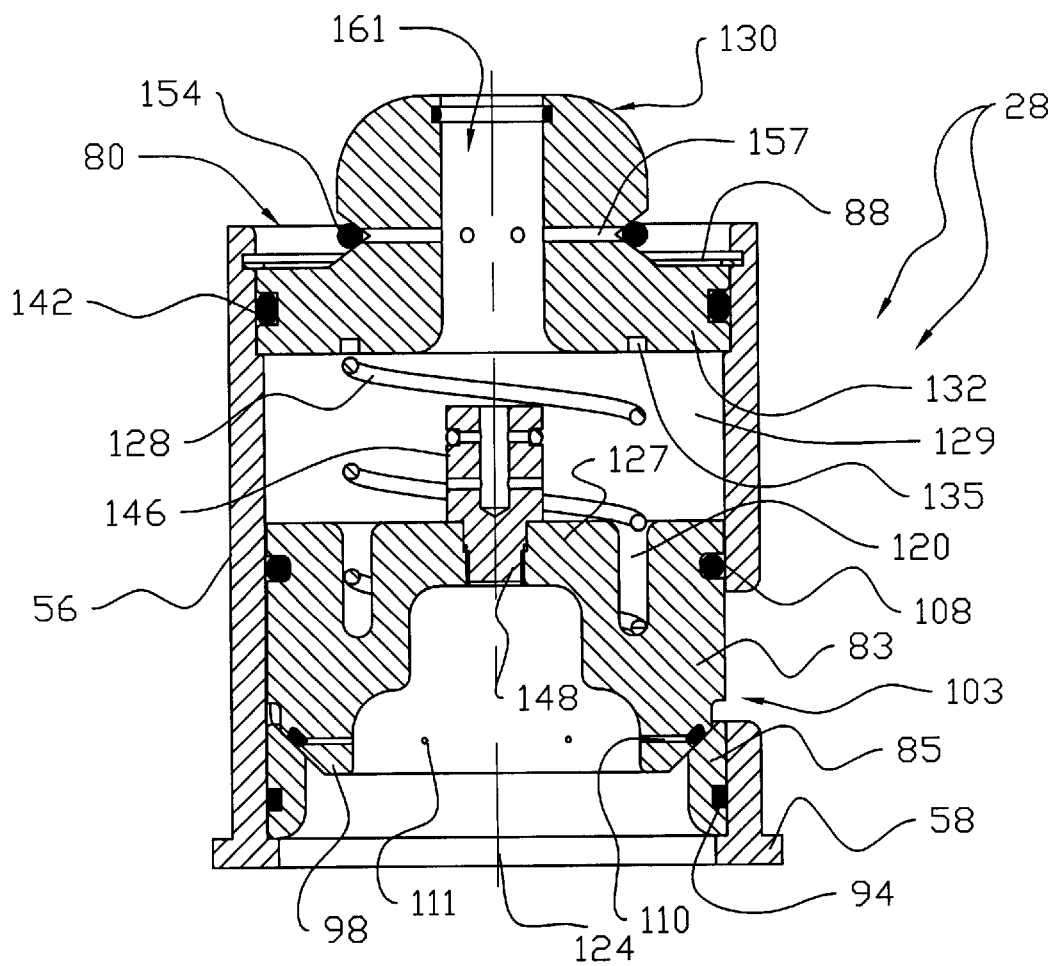
Fig. 5 (axis)

HIGH STRESS BLAST AERATOR WITH DAMPENDED PISTON

BACKGROUND OF THE INVENTION

I. Field of the Invention

This invention relates generally to air-accumulator and discharge devices of the type generally known as air blasters, air cannons, or blast aerators. More particularly, the present invention relates to heavy duty blast aerators of the type classified in United States Patent Class 222, Subclasses 2, 3 and 195 and Class 251, Subclass 30.02.

II. Description of the Prior Art

As is well know to those with skill in the art, the passage of bulk materials through conventional handling equipment is often degraded or interrupted. Typical bulk materials comprise concrete mixtures, grains, wood chips or other granular materials disposed within large hoppers or storage bins. In conventional, conically shaped hoppers, for example, bridges or arches of bulk materials often form, preventing or minimizing the orderly flow or delivery of granular materials. Often, "rat holes" or funnels build up, and material passage is severely degraded or halted altogether. Particles of bulk material may form cohesive bonds either by adhesion due to chemical or hydrostatic attraction, or particles may interlock because of horizontal and vertical compression. Such materials usually tend to cake or congeal during bulk processing. When moisture accumulates, unwanted caking tends to block flow. It is also recognized that friction between bulk material and the walls of a typical bunker or hopper in which the material is confined tends to interfere with proper flow.

Blast aerators or air cannons have long been employed to dislodge blocked or jammed bulk material. Storage bins or hoppers, for example, are often fitted with one or more high pressure air cannons that periodically blast air into the interior to dislodge caked particles, break funnels and bridges, and destroy rat holes. Bulk flow problems can temporarily be stopped by physically vibrating the hopper or container to shake loose the jammed materials. But not all materials may be dislodged in this manner. For example, large concrete bunkers may be impossible to vibrate. Materials like soft wood chips ordinarily absorb vibratory energy and must be dislodged by other methods.

Air blasters are preferred over vibrators because of efficiency. The forces outputted by blast aerators are applied directly to the material to be dislodged, rather than to the walls of the structure. Modern air blasters are also preferred over air slides, air wands, and various air screen devices which operate at low pressures. Live bottoms in hoppers or bins are limited in their effectiveness, since they may tend to create bridging or arching of material. Modern air cannons or blast aerators are intended for use as a flow stimulator against materials that are primarily moved by gravity. They are not intended to be the prine movers of such materials, and for safety purposes they should not be used to initiate the flow or movement of bulk materials unless a gravity feed is employed.

Typical blast aerators comprise a large, rigid holding tank that relatively slowly accumulate air supplied through the H.P. air lines available at typical industrial facilities. A special valve assembly associated with the tank includes a high volume discharge opening directed towards or within the target application. The valve structure periodically activates the air cannon, and the large volume of air that was slowly accumulated in the holding tank is rapidly, forcibly discharged within a few milliseconds. The volume of compressed air released by a typical quick opening valve in a modern blast aerator strikes the bulk material at a rate of between five hundred feet per second to eight hundred feet per second. Materials exposed to this high volume inrush are forcibly dislodged by impact. The large volume of air outputted by the aerator spreads throughout the bin or hopper, distributing forces throughout the interior that tend to homogenize and dislodge the mixture.

Thus, the blast of the shock wave rapidly destroys any formations of bulk material that might otherwise hinder fluid flow. After an exhaust blast, the valve apparatus returns to a "fill" position, wherein an internal, displaceable piston typically blocks the aerator blast output path. The cycle repeats as air that has relatively slowly accumulated again within the blaster is subsequently discharged during the next cycle. A variety of methods have been proposed for controlling the aerator valve assemblies. Various means such as electrical solenoids have been provided for allowing or forcing the discharge piston to rapidly retreat from its normally sealed, blocking position abutting the discharge valve passageways.

U.S. Pat. No. 4,469,247, issued Sep. 4, 1984, and owned by Global Manufacturing Inc., discloses a blast aerator for dislodging bulk materials. The blast aerator tank has a blast discharge opening coaxially aligned with its longitudinal axis. The blast discharge assembly comprises a rigid, tubular discharge pipe comprising an internal shoulder that forms a valve seat. A resilient piston coaxially, slidably disposed within the pipe abuts the valve seat to seal the tank during the fill cycle. In the fill position the seal is maintained by a chamfered end of the piston that matlingly, sealingly contacts a similarly chamfered seat portion of the valve seat assembly. A cavity at the piston rear is pressurized to close the valve by deflecting the piston. During periodic cycles, discharge occurs in response to cavity venting, whereupon the piston is rapidly displaced away from the valve seat, exposing the discharge pipe opening to the pressurized tank interior.

Blast aerators characterized by the foregoing generalized structure may be seen in U.S. Pat. Nos. 3,651,988; 3,915,339; 4,197,966; 4,346,822; and 5,143,256. Other relevant blast aerator technology may be seen in Great Britain Pat. Nos. 1,426,035 and 1,454,261. Also relevant are West German Patent 2,402,001 and Australian Pat. No. 175,551.

Global Manufacturing patent No. 4,496,076 teaches a method of employing a plurality of air cannons in a controlled array.

In some prior art aerator designs, the piston and valve assembly are disposed at a right angle relative to the discharge flow path. In addition, many blast aerators use a valve assembly that is mounted externally of the accumulator tank. The latter design features are seen in U.S. Pat. Nos. 3,942,684; 4,767,024; 4,826,051; 4,817,821; and 5,853,160.

During the hundreds of thousands of repetitive discharge cycles occurring over the normal life of a typical blast aerator, critical moving parts will inevitably wear and deform. Typical pistons encounter extremely highly stresses from heat, friction, and pressure that eventually result in component failure. For example, as the piston deforms or wears, its ability to properly seal during the critical "fill cycle" is impaired. In many prior art designs that portion of the piston utilized to create a seal also functions as the working surface upon which tank pressure acts to force the piston to its rearward "blast" position, further aggravating component stress and shortening valve life. In operation, the piston must rapidly travel away from the seal during the discharge cycle. As it deforms over hundreds of thousands of blast cycles however, it may lose its symmetry, and misalignment within the valve tube can slow piston travel, enlarging the blast the period and denigrating the force of the discharge. When critical structural parts fail, injury to operating personnel may occur. At the very least, aerator component breakdown may severely limit bulk flow efficiency.

Therefore some form of dynamic control over the piston that limits stress would seem desirable. Some attempts in this direction are acknowledged.

U.S. Pat. No. 5,441,171 discloses a protrusion on the rear of a slidably captivated piston to help slow the piston after firing. This design does not bleed air off in a controlled fashion and in fact the protrusion does not shut off the flow of air out of the valve body.

U.S. Pat. No. 5,517,898 discloses a pneumatic cylinder in which coaxially disposed "pistons" include dampening sleeves. In other words, ports are interconnected with internal passageways including stem portions of the cylinder to dampen piston movement by compressed air.

I have found that it is desirable to not only dampen piston travel and movements, but to control the flow of air from the valve body. To dampen piston movement, it is proposed to bleed off pressure in a controlled fashion. I have found it desirable to pressurize the entire rear area of the piston to prevent damaging internal impacts.

SUMMARY OF THE INVENTION

A quick acting blast aerator system according to my invention comprises a rigid, cylindrical tank adapted to be secured upon a container or hopper. A preferred embodiment is ideal for high temperature applications. The aerator comprises a special valve assembly preferably mounted within the tank. The high temperature variation includes a metallic, heat-resistant piston, and a special dampening system for preventing piston damage.

The preferred valve assembly comprises a rigid, tubular-body having a pair of opposed ends, and a plurality of exhaust vents. The body is secured with suitable flanges to the tank discharge end. An elongated, fill pipe extends through the tank interior to the actuator valve assembly for delivering air. The inlet pipe is controlled by suitable, conventional external solenoid valves that alternately pressurize it (i.e., by connection with factory H.P. air) and depressurizes it (i.e., for aerator firing). A piston is slidably mounted within the valve assembly body and normally blocks the exhaust vents during tank filling. Preferably the piston contacts an internal valve seat coaxially secured to the valve assembly body at one end. When the piston is deflected away from valve seat the exhaust vents are unobstructed and discharge of the aerator occurs. In the high temperature mode, the piston is heat resistant. It is preferably made of 6061-T6 aluminum. The low temperature piston is made from resilient material Such as polypropylene.

A rigid valve cap is sealed and fitted at the top of the valve assembly body and closes the valve actuator assembly. A snap-ring seated within a suitable ring groove holds the cap coaxially within the actuator valve body. Preferably the valve cap comprises an upper, domelike portion and an integral, lower disk portion coaxially fitted to the actuator body. Importantly, an air control ring groove defined in the cap forms a boundary between the dome and disk portions. Further, an internal dampening passageway extends through both the disk and dome portions. A resilient, air-control O-ring seated within the air control groove functions as a one-way valve. Numerous internal, radially spaced-apart, air passageways extend from the interior dampening passageway to the air-control groove, and these conduct air into the aerator to fill the tank by dislodging the air-control O-ring.

The piston moves from a tank-fill position bearing against the valve seat, to a retracted position exposing the exhaust vents. An internal return spring extends between a deep, annular recess formed in the piston, and a glove formed in the bottom of the end cap. Importantly, in the high temperature embodiment, the piston comprises a generally cylindrical dampener that is received within the dampener passageway longitudinally traversing the end cap. The preferred dampener comprises a lower diameter portion screwed to a threaded recess in the piston top, and an upper, generally cylindrical portion that enters the dome passageway. A central bore extends concentrically through the dampener interior. An upper ring, groove in the dampener seats an O-ring. Accidental dislodging of the O-ring is prevented by venting passageways extending between the dampener interior bore and the dampener O-ring groove. Further passageways beneath the dampener O-ring establish fluid flow communication between the dampener exterior and its bore for dampening control.

Thus a basic object is to provide a highly reliable blast aerator or air cannon whose piston is conditioned for the high stresses encountered in response to both high pressure and high temperatures.

Another object is to provide a blast aerator of the character described in which the internal quick dump valve subassembly is operationally disposed completely within the holding tank.

A fundamental option is to provide a high capacity blast aerator of the character described with an improved valve assembly. It is a feature of my invention that a special piston design provides controlled dampening of the piston during its rearward stroke to minimize mechanical shock.

A related object is to control piston wear and minimize piston deformation by pneumatically cushioning and controlling the piston during blast discharges.

Another general object of this invention is to provide a dampened piston and valve assembly that extends the useful life of the apparatus.

A still further basic object is to provide a blast aerator of the character described that minimizes the frequency of service calls required in the field.

A further object is to provide an improved valve assembly that can be retrofitted to existing blast aerators and air canionis.

Another object of this invention is to provide a blast aerator of the character described characterized by a high volume blast Output valve assembly.

Another important object is to maximize the efficiency and life of the valve assembly piston by dynamically cushioning it during critical movements.

A still further object is to provide a blast pipe assembly of the character described which can easily and efficiently be employed with existing aerator tank designs.

These and other objects and advantages of this invention, long with features of novelty appurtenant thereto, will appear or become apparent in the course of the following descriptive sections.

BRIEF DESCRIPTION OF THE DRAWINGS

In the following drawings which form a part of the specification and which are to be construed in conjunction therewith, and in which like reference numerals have been employed throughout wherever possible to indicate like parts in the various views:

FIG. 5 is an enlarged, fragmentary, sectional view of the high temperature actuator valve assembly;

FIG. 6 is a top plan view of the high temperature actuator valve assembly of FIG. 5;

DETAILED DESCRIPTION

Figure 1:
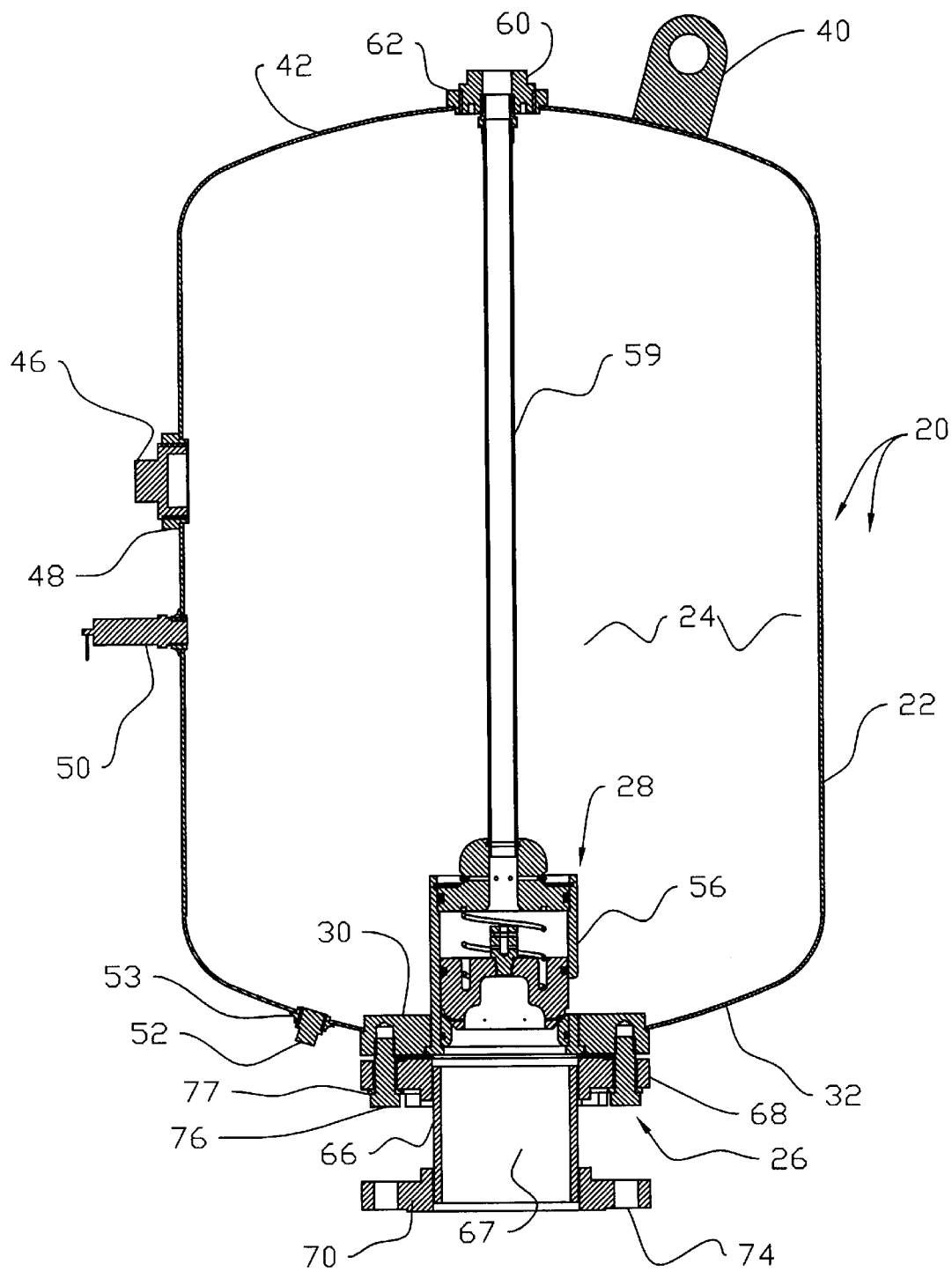
FIG. 1 is a fragmentary sectional view of my new high temperature blast aerator with my new dampened actuator, with portions thereof shown in section or broken away for clarity.
Figure 2:
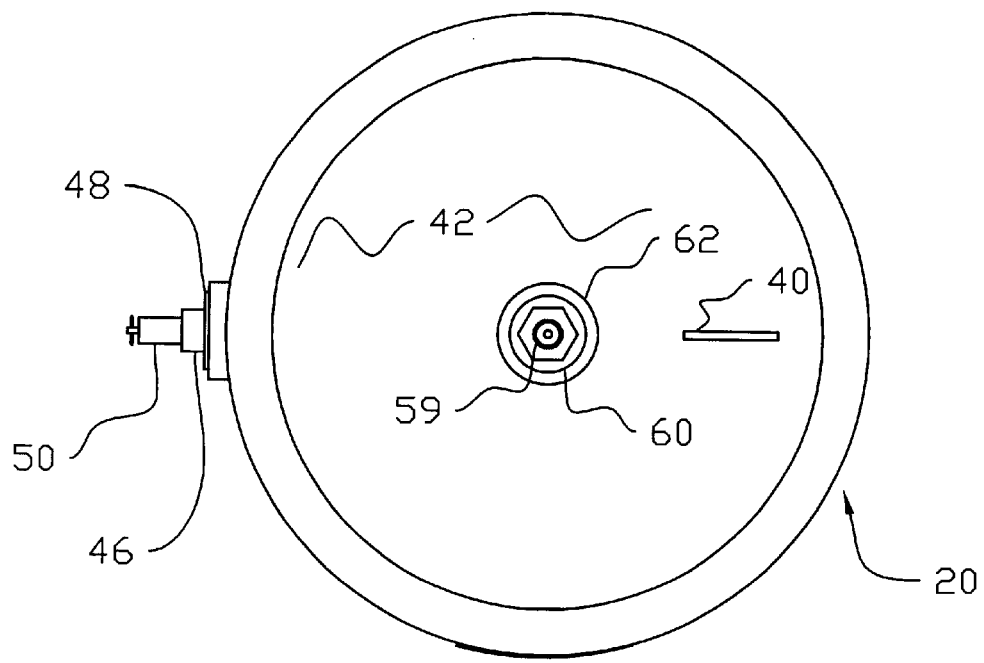
FIG. 2 is a top plan view of the high temperature blast aerator taken generally from a position above FIG. 1
Figure 3:
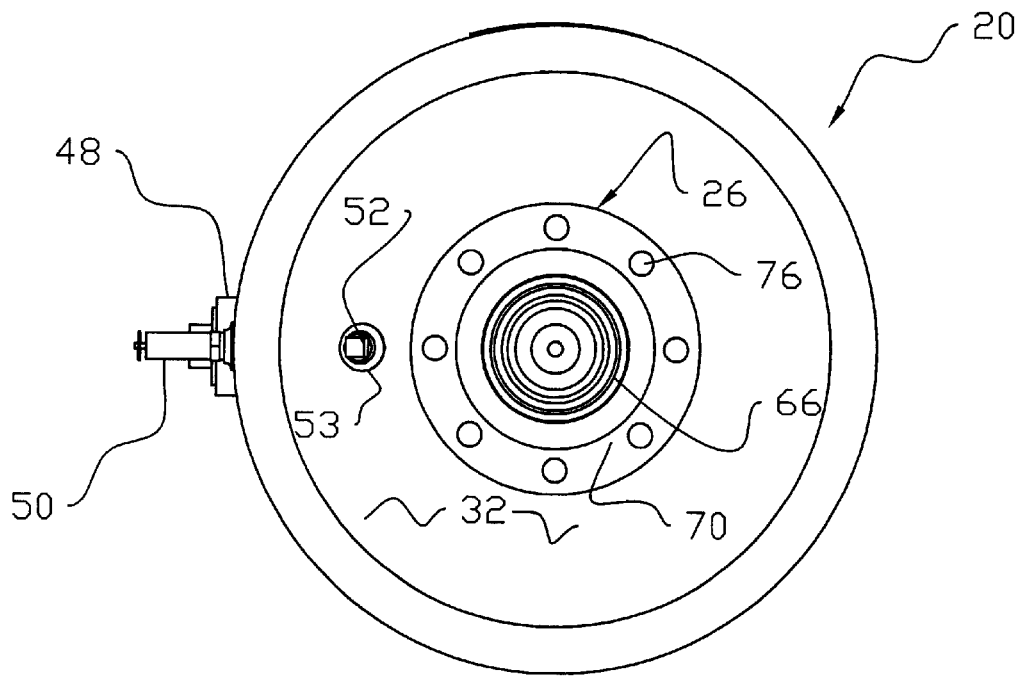
FIG. 3 is a bottom plan view of the high temperature blast aerator taken generally from a position beneath FIG. 1.
Figure 4:
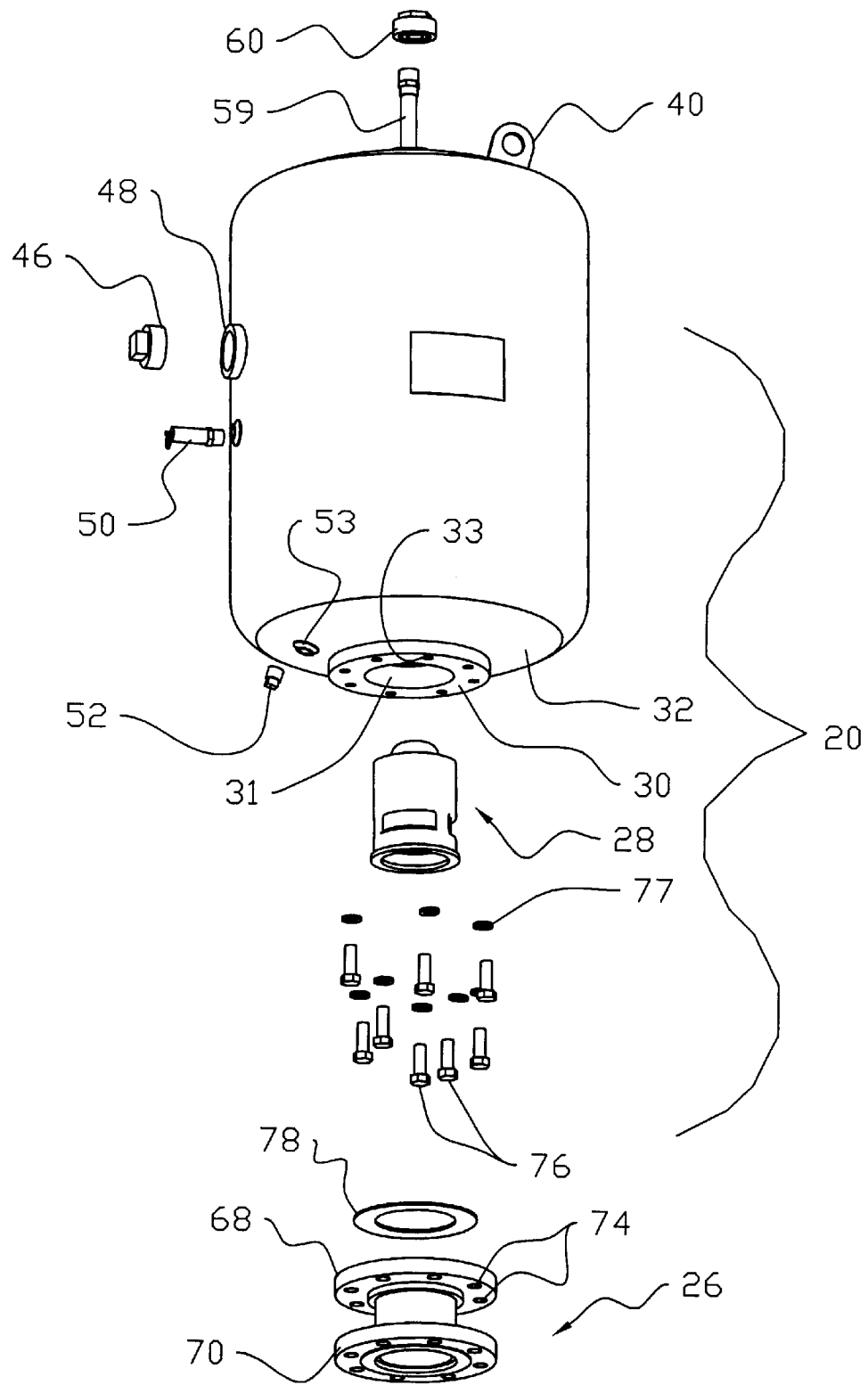
FIG. 4 is an exploded isometric view of the preferred high temperature blast aerator.

With initial reference now directed to FIG. 1–6 of the appended drawings, a high temperature blast aerator constructed in accordance with the best mode of the invention has been generally designated by the reference numeral 20.

Figure 17:
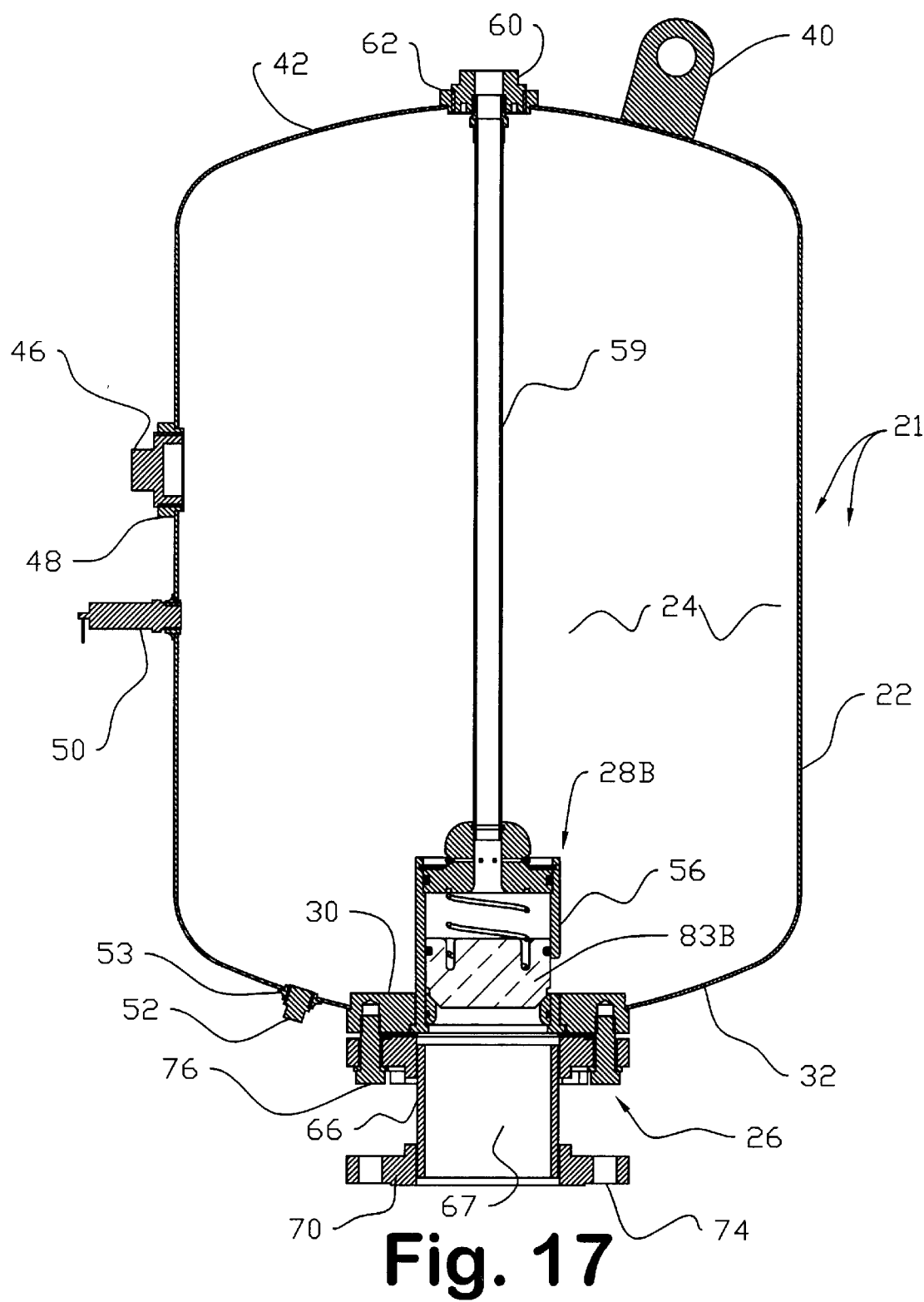
FIG. 17 is a fragmentary sectional view of an alternative low-temperate embodiment, with portions thereof shown in section or broken away for clarity.
Figure 19:
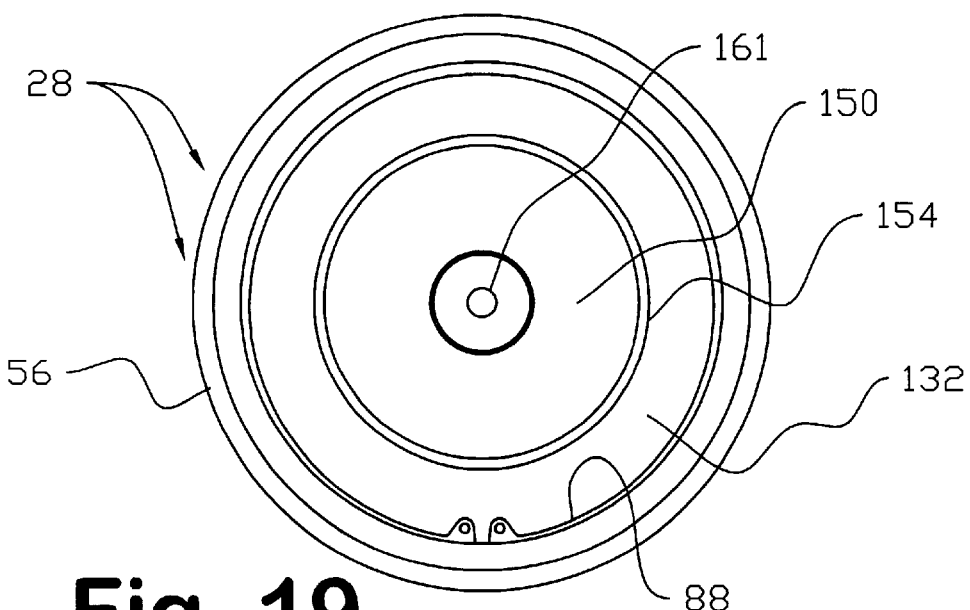
FIG. 19 is a top plan view of the low temperature actuator valve assembly of FIG. 18.
Figure 18:
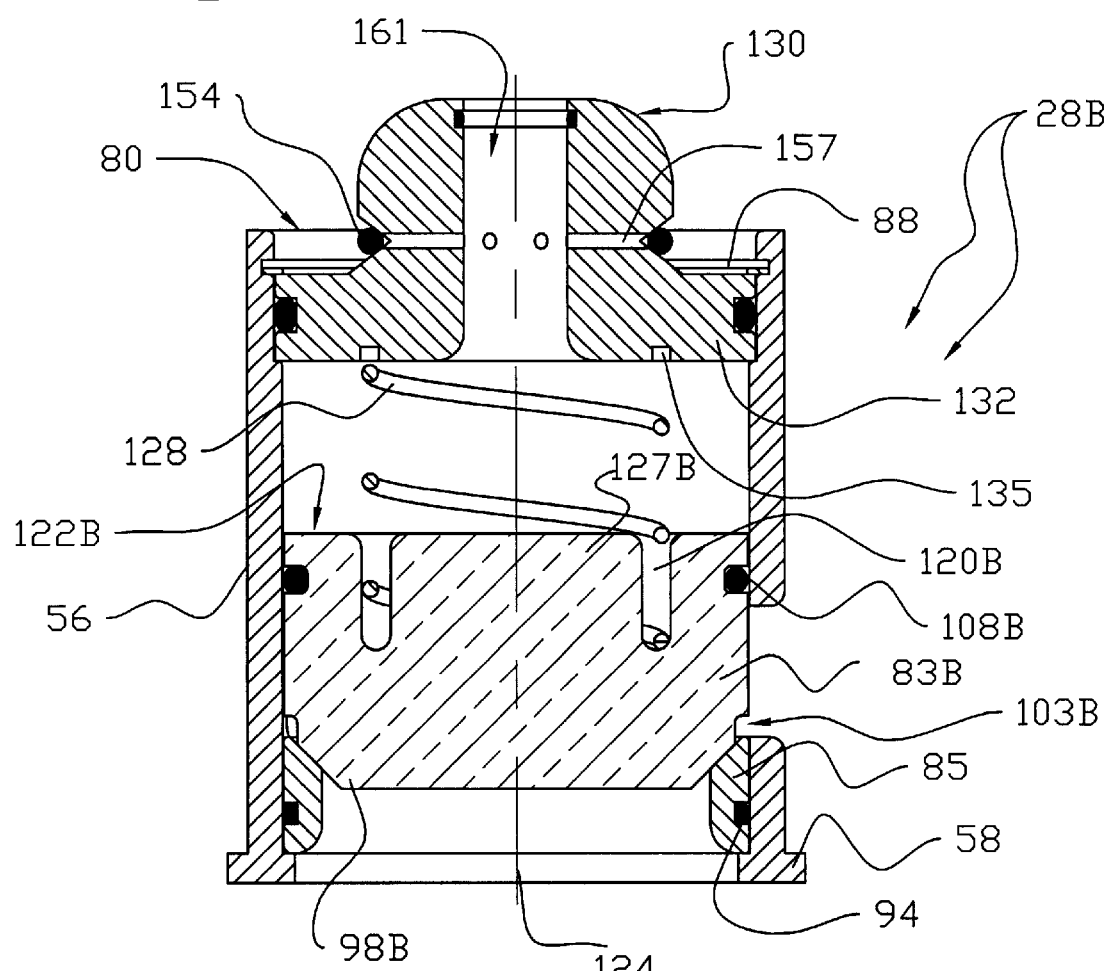
FIG. 18 is an enlarged, fragmentary, sectional view of the low temperature actuator valve assembly.
Figures 20, 21:
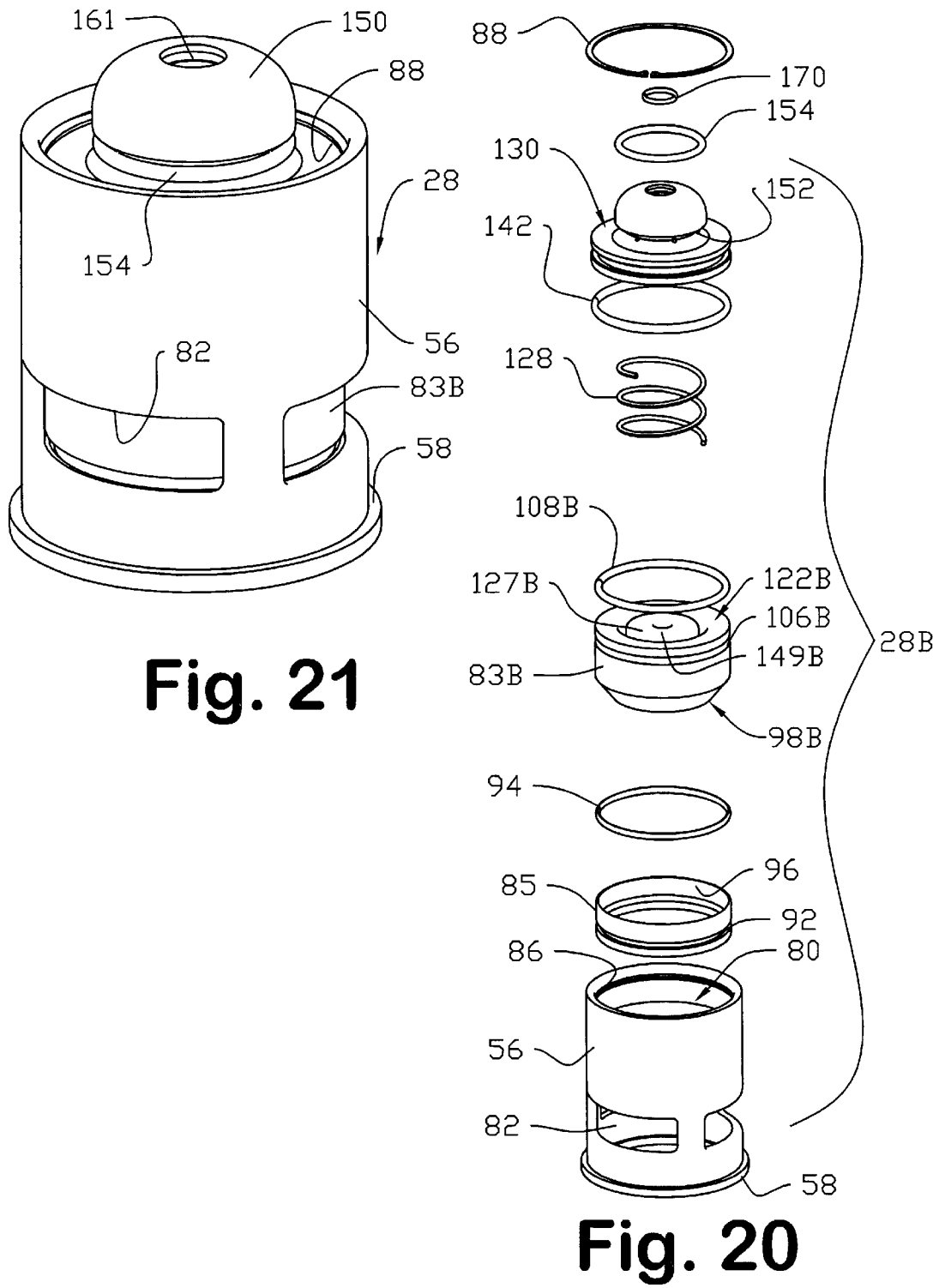
FIG. 20 is an exploded, isometric view of the preferred low temperature actuator; and, FIG. 21 is an isometric view of the low temperature actuator valve assembly.

As described hereinafter, a preferred low temperature aerator is designated by the reference numeral 21 (FIG. 17). Aerator 20 comprises a rigid, barrel-like tank 22 of conventional construction that is mounted adjacent or upon a storage bin, hopper or the like. Aerator 20 is ideally adapted for attachment to high temperature applications such as ovens or kilns, and includes a special valve assembly described later that employs a metallic, heat-resistant piston. As explained hereinafter, the interior 24 (FIG. 1) of the blast aerator tank 22 accumulates air that is periodically discharged through a standard, twin flange coupling 26 that is coupled through standard pipes (FIGS. 7, 14) recognized by those skilled in the art that extend to the selected bulk material application (i.e., hopper, bin, bulk material storage tank etc.). Air that has accumulated within tank interior 24 is periodically discharged by the new valve assembly 28, that is coaxially secured within the aerator interior 24 by a rigid, front mounting flange 30 coaxially disposed at the output end 32 of tank 22.

Tank 22 can be dimensioned in various sizes and shapes, as will be recognized by those skilled in the art. Preferably, tank 22 comprise a rigid tab 40 welded to its rear end 42 that facilitates mounting and handling. Optionally, a removable tank inspection plug 46 (FIG. 1) and a mating socket 48 may be included for ease of service and maintenance. A high pressure relief valve 50 is preferably threadably attached below plug 46. An auxiliary inspection plug 52 is threadably attached to socket 53 welded to the output end 32 of the tank. As best viewed in FIG. 4, mounting flange 30 has a central aperture 31 through which the valve assembly 28 is inserted for mounting. Flange 30 comprises a plurality of conventional, radially spaced-apart tapped orifices 33 (FIGS. 4, 7) for threadably receiving, conventional mounting bolts.

Figure 7:
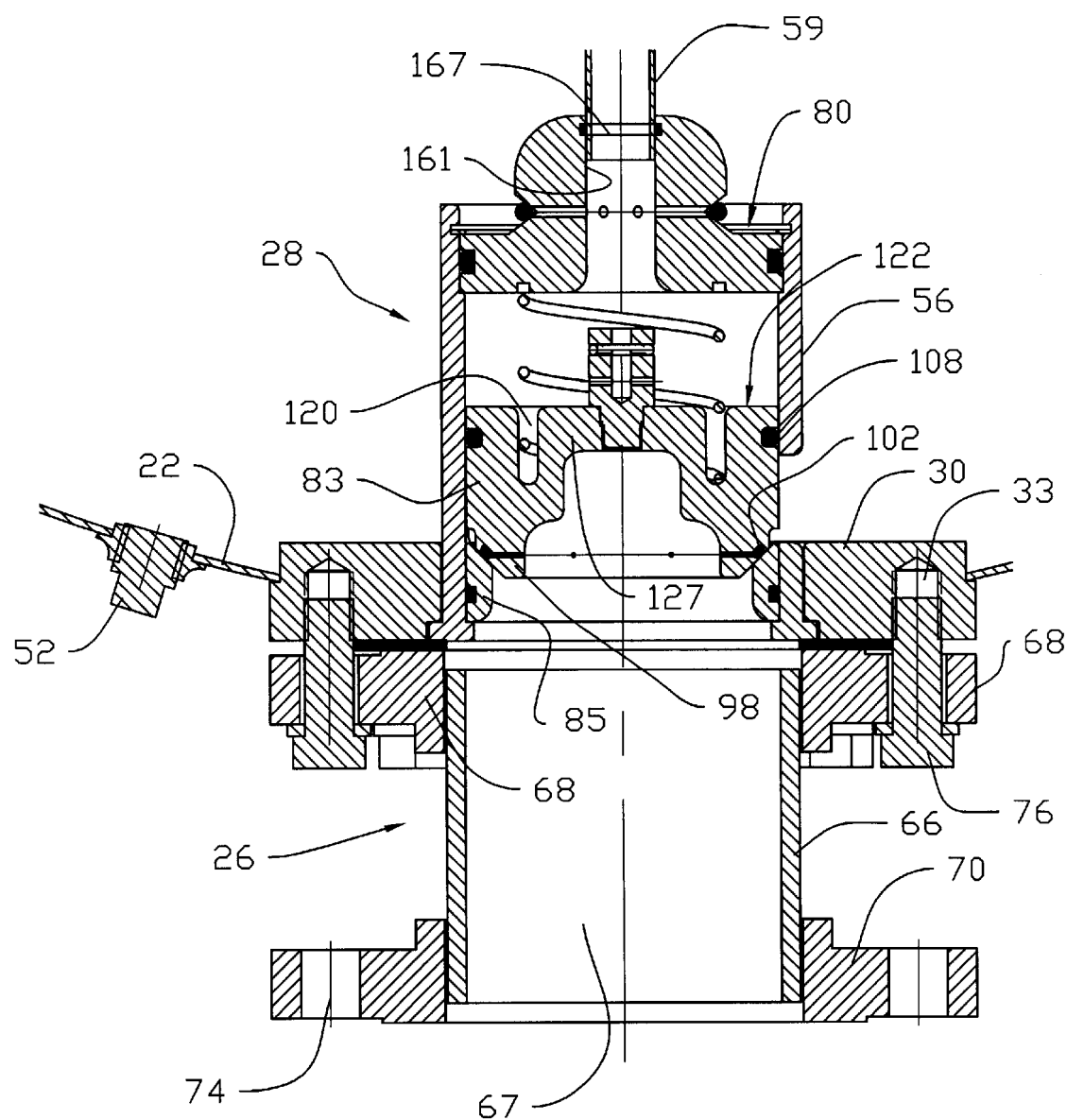
FIG. 7 is an enlarged, fragmentary, longitudinal sectional view of a preferred actuator valve assembly shown coupled to the preferred flanged coupling.

As best seen in FIG. 5, the valve assembly body 56 has an integral, larger diameter flange portion 58 that concentrically seats within a suitable counterbore (not shown) concentrically defined in flange 30 (i.e., FIGS. 1, 7). An elongated, tubular fill pipe 59 (FIG. 1) that is coaxial with the longitudinal axis of the tank 22 extends within tank interior 24 between actuator valve assembly 28 and a bushing 60. This pipe comprises an air inlet means for filling, the tank. The bushing, 60 is threadably coupled to a rigid socket 62 coaxially welded to the tank real end 42 (FIG. 1). Suitable external pneumatic solenoid control valves (not shown) coupled to busling, 60 (FIG. 1) in the usual manner control the aerator 20 by actuating valve assembly 28, as will hereafter be described. In general, a one inch, three-way, normally-open electric solenoid valve is preferred. The solenoid control valve interconnects the valve assembly with a factory source of H.P. air for filling, and/or switches to ambient air pressure for firing. A suitable conventional electric timer activates the timer at selected intervals, typically causing aerator discharge once an hour. Examples of solenoid valve details are seen in prior U.S. Pat. Nos. 4,469,247 and 4,496,076 owned by Global Manufacturing Inc., the assignee herein, which, foor disclosure purposes, are hereby incorporated by reference.

With primary reference now directed to FIGS. 1, 3, 4 and 7, the preferred twin flange coupling 26 comprises a rigid, central pipe 66 that coaxially extends between an inner flange 68 and an outer flange 70. Pipe 66 defines a central passageway 67 (FIG. 1, 7) through which large volumes of air are delivered upon aerator activation. Both flanges 68, 70 comprise numerous conventional, radially spaced-apart mounting orifices 74 (FIG. 4) that receive conventional bolts 76 (and lock washers 77) that secure coupling, 26 to tank flange 30. The valve assembly 28 concentrically seats within the counterbore defined in flange 30. Gasket 78 is sandwiched between tank flange 30 and the inner flange 68 of coupling 26.

Figure 14:
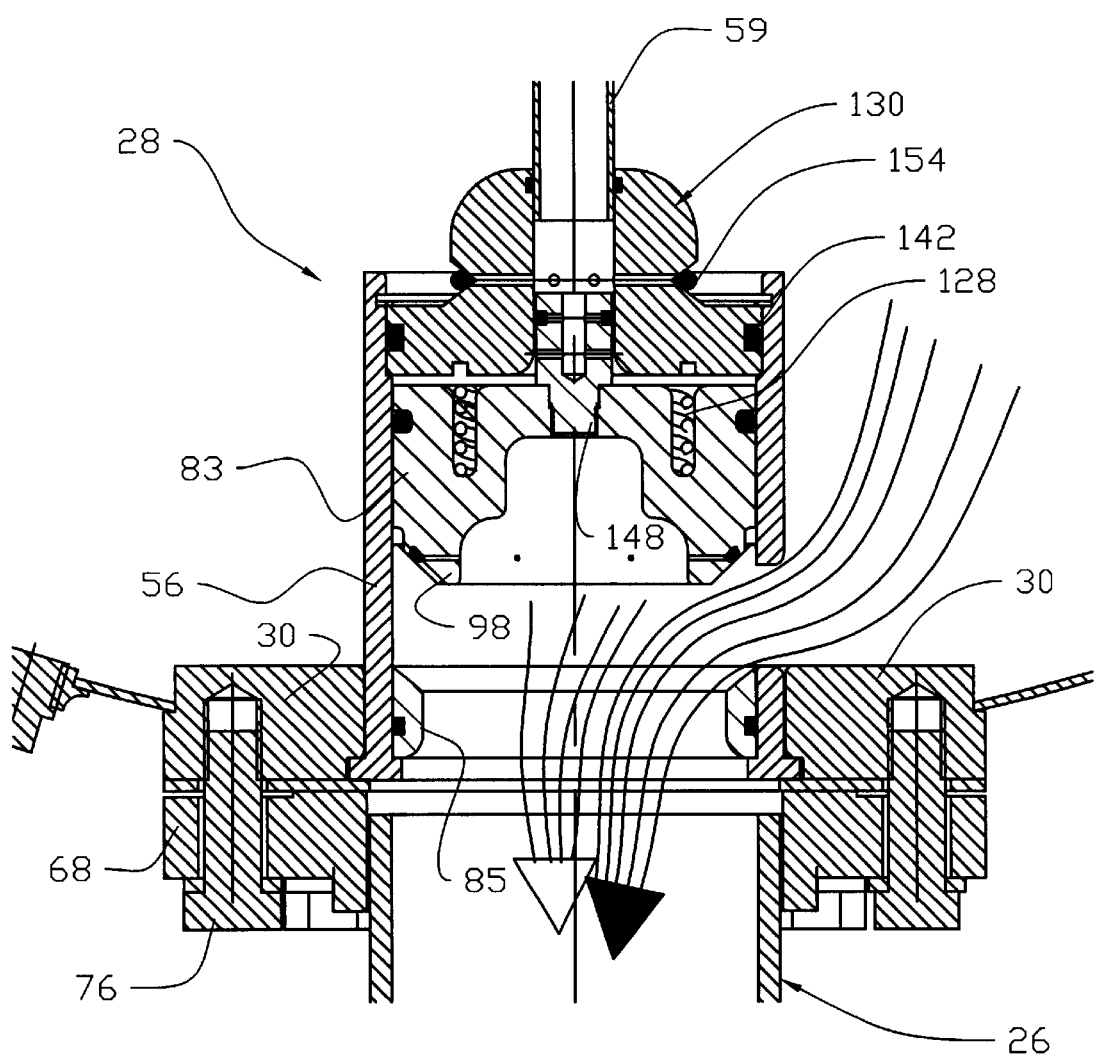
FIG. 14 is an enlarged, fragmentary, and sectional diagrammatic view of the high temperature valve assembly, with portions thereof shown in section for clarity or omitted for brevity, illustrating component position when in a discharging position.
Figure 16:
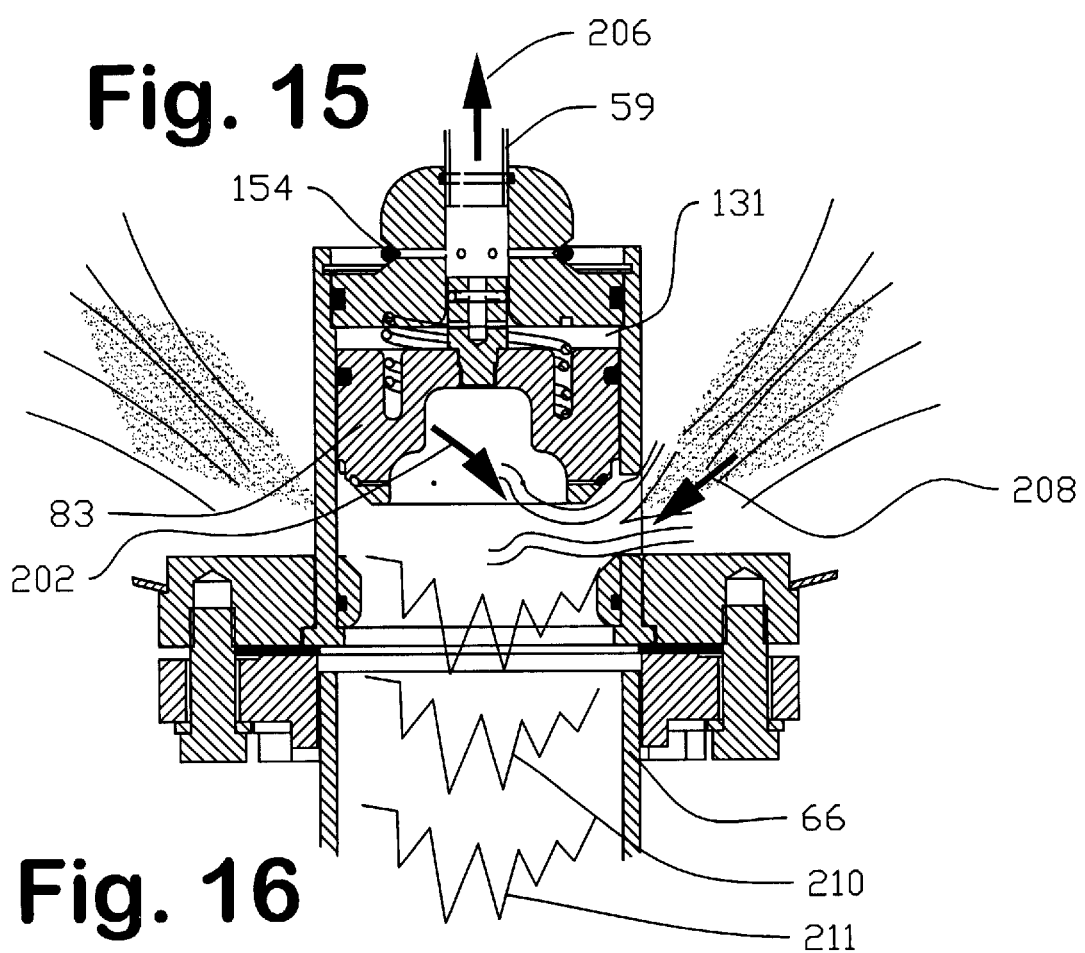
FIG. 16 is a fragmentary diagrammatic view similar to FIGS. 14 and 15 but showing valve assembly piston movement as it retracts from the closed, fill position of FIG. 15 to the discharge position of FIG. 14.

With emphasis now directed to FIGS. 5–10, the improved actuator assembly 28 is generally cylindrical in appearance. The elongated, tubular valve body 56 comprises a circumferential flange 58 discussed previously that coaxially seats within tank flange 30 and thus aids in centering and alignment. The opposite, open end 80 exposes the tubular inside of the valve body 56, which generally coaxially receives numerous valve assembly parts (FIG. 9) to be discussed later. Air accumulated in tank 22 is discharged through exhaust vents 82 (FIG. 9) defined in valve assembly body 56. A preferably metallic piston 83 that is slidably mounted within valve assembly body 56 normally blocks exhaust vents 82 during the fill cycle. But when deflected away from valve seat 85 (i.e., as illustrated in FIGS. 14 and 16) the vents 82 are exposed to rapidly vent air from the tank interior 24 to through coupling 26 discussed earlier.

In the best mode, the heat-resistant piston 83 is preferably machined from 6061-T6 aluminum. (The low temperature aerator 21 (FIG. 17) to be discussed later employs a resilient piston made from material such as polypropylene.) It appears from recent experiments that a metal coating or chrome plating improves wear resistance, and may improve sustained piston operation in very high temperature environments. Various coatings suitable for metallic parts are commercially available, as will be recognized by those with skill in the art, but experimental results are not definitive at this time. However, it appears that heat resistant, self lubricating coatings are preferred. The high temperature aluminium piston 83 is of relatively low mass, which minimizes inertia, and enables rapid piston movements. It has functioned adequately at tent temperatures of 400 degrees F. however, aluminum pistons suitable for blast aerator use must be adequately cushioned or dampened during at least a portion of their travel, and means are provided for that purpose as discussed hereinafter.

Figure 10:
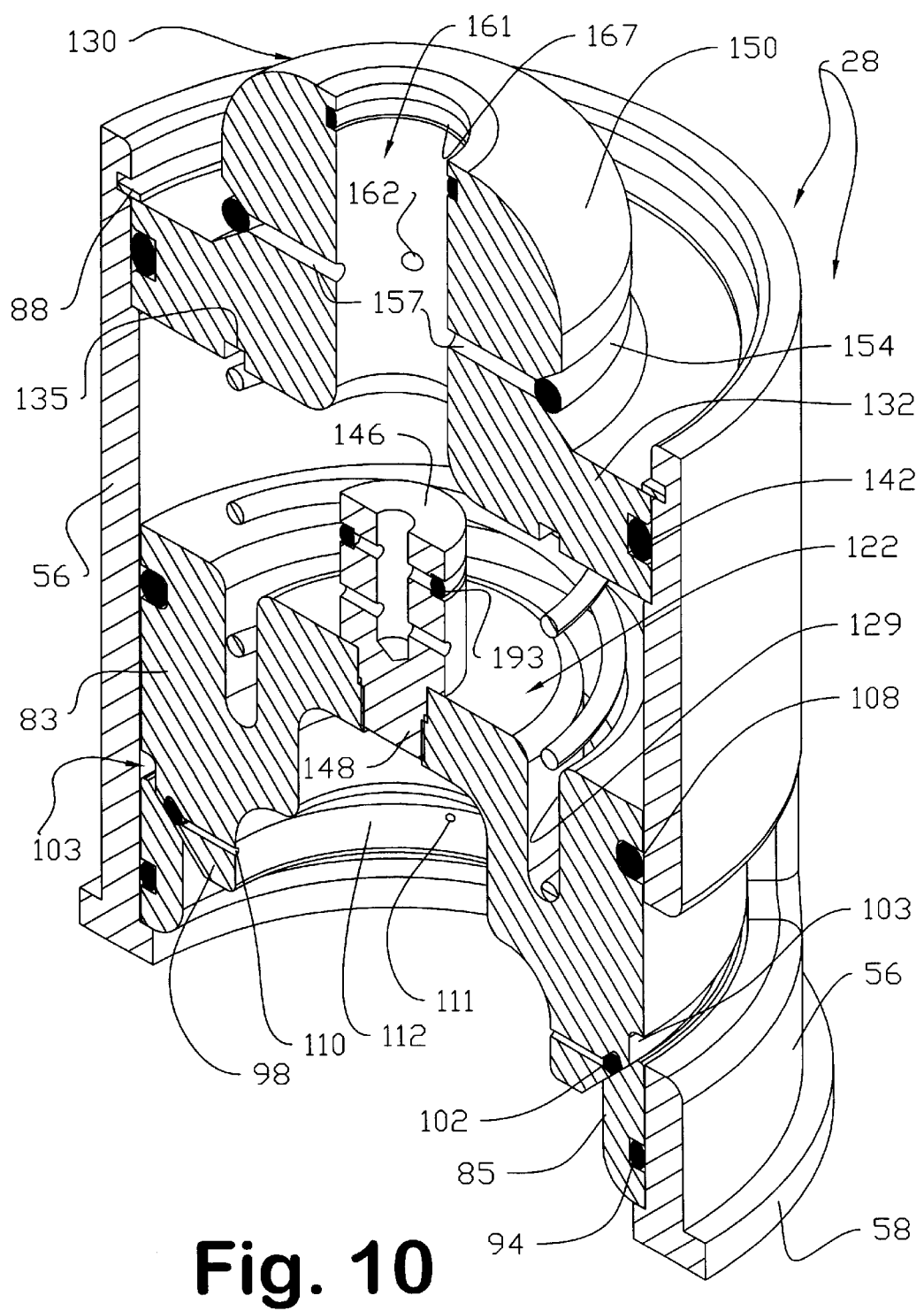
FIG. 10 is an enlarged, fragmentary isometric view of the preferred high temperature actuator valve assembly with portions thereof shown in section for clarity.

An internal ring groove 86 (FIG. 9) defined in the open end 80 of the valve body seats a snap ring 88 that secures the parts together in assembly. Preferable the annular valve seat 85 comprises an external groove 92 that receives a suitable O-ring 94. As best seen in FIGS. 5 and 10, the lowermost portion of the valve seat 85 is urged against and retained by the internal ledge provided by valve body flange 58. The inner end of the valve seat 85 includes an internally beveled or chamfered portion 96 that mates with the tapered end 98 (FIGS. 9, 10) of the piston 83. Piston end 98 (FIG. 9) has a concentric ring groove 100 that receives an O-ring 102 that is spaced apart a from concentric ledge 103 (FIG. 10) circumscribing the piston bottom. Piston ledge 103 is disposed adjacent exhaust vents 82 when the piston is disposed in the "fill" position. High pressure air within the filled tank exerts pressure on the piston 83 via ledge 103 which is sufficient to dislodge piston 83 when dampener passageway 161 is vented to atmosphere. The fill pipe 59 vents tile dampener passageway when it is depressurized by external solenoid valves to fire the aerator.

Piston 83 has an upper coaxially centered ring groove 106 that seats an external O-ring 108. As best seen in FIG. 10 a plurality of radially spaced apart air passageways 110 are defined in the tapered end 98 of the piston 83. These passageways 110 extend between ports 111 in the terminal, interior piston surface 112 (FIG. 10) and the ring groove 100 (FIG. 9) circumscribing the bottom, tapered end 98 of the piston 83. Resilient O-ring 102 normally occupies ring groove 100 to seal the piston against the seat. In operations when the piston is rapidly deflected, air velocities in the immediate proximity of the piston and O-ring generate high pressures that can dislodge and deform the critical O-ring. The venting passageways 110 dynamically neutralize potentially deforming pressures, thereby preventing unwanted O-ring travel.

As best seen in FIGS. 5 and 10, a relatively deep, annular recess 120 is formed in the top 122 of aluminum piston 83. Recess 120 is concentric with the longitudinal axis 124 (FIG. 5) of the piston 83, and with the integral, reduced diameter center portion 122. A return spring 128 concentrically seated within recess 120 atop piston 83 surrounds piston center portion 127 and extends upwardly into mechanical contact with a valve cap 130. The upper portion of springy 128 is seated within an annular groove 135 cut into the underside of the lower disk portion 132 of valve cap 130. After the aerator 20 discharges, spring 128 rapidly pushes the piston back into sealing contact with the valve seat 85. Importantly, the deep recess 120 is sized to adequately seat and house the compressed spring 128, which compresses during piston travel when the aerator is activated. In this manner, unwanted, potentially injurious mechanical contact of the Spring with the valve cap 130 is prevented, as adequate spring clearance is provided by the captivating recess 120.

Figures 8, 9:
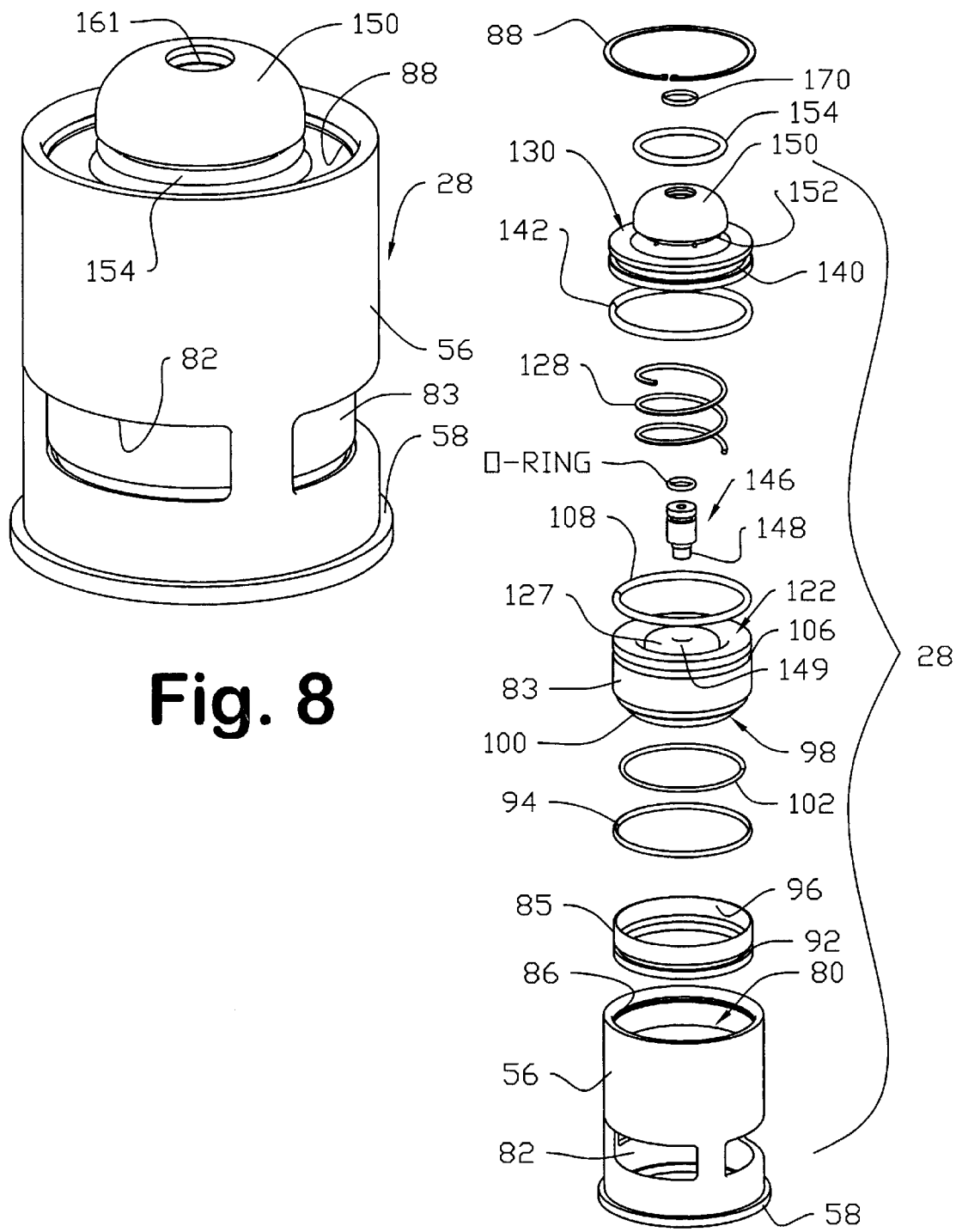
FIG. 8 is an isometric view of the high temperature actuator valve assembly.
FIG. 9 is an exploded isometric view of the preferred high temperature actuator.

Noting FIGS. 5, 7 and 8 collectively, the valve cap 130 closes the valve actuator assembly. Concentric, valve cap disk portion 132 comprises an outer ring groove 140 (FIG. 9) that seats an O-ring 142 that seals the valve cap within valve assembly body 56. As mentioned earlier, snap-ring 88 holds the cap 130 within body 56 notwithstanding pressure from internal spring 128. Importantly, a dampener 146 is secured to the piston's central portion 127, coaxially aligned with longitudinal axis 124 (FIG. 5). The integral, threaded, reduced diameter portion 148 of the plug damper is screwed directly into a suitable passageway 149 (FIG. 9) formed at the piston center.

Valve cap 130 comprises an upper, dome-like portion 150 that is integral with lower disk portion 132. A peripheral, air control ring groove 152 (FIG. 9) forms a boundary between dome 150 and disk portion 132. A resilient, air-control O-ring 154 occupies the air control groove 152, and functions as a one-way valve. A plurality of radially spaced-apart, transverse air passageways 157 extend from the valve cap interior dampening passageway 161 through inlet ports 162 (FIG. 10) to ring groove 152. Air control O-ring 154 is normally captivated within the air control ring groove 152 but functions as a valve, allowing one way air passage by deflecting in response to predetermined air pressure radially applied to it by passageways 157. This facilitates tank filling, as high pressure air entering via pipe 59 (FIG. 1) traverses passageways 157 (FIG. 10), yieldably deflecting the air-control O-ring 154 and filling the aerator tank 22. The dome portion 150 of the valve cap 130 comprises an internal ring groove 167 (FIGS. 7, 10) that seats O-ring 170 to seal inlet pipe 59 (i.e., FIGS. 1, 7) that delivers air to pressurize the interior of the valve assembly.

When piston 83 moves from the tank-fill position illustrated in FIGS. 5 and 10 to the discharge position of FIG. 14, the volume 129 (FIGS. 5, 15) between the piston 83 and the end cap disk portion 132 shrinks; air trapped therewithin acts as a cushion as it compresses, and a dampening effect upon the piston is provided. Volume 129 (i.e., FIG. 15) contracts during piston displacement to the much smaller volume 131 (FIG. 16). During this piston movement the return spring 128 is shielded within piston recess 120. As the piston moves upwardly the dampener 146 eventually enters the dampening passageway 161 (FIGS. 5, 10). Air entrapped within shrinking volume 129 is vented through dampening passageway 161 through the fill tube 59 (FIG. 1, 7). Piston travel is dampened by reduced venting rates caused by dampener 146 entering passageway 161. The dampening provides a cushioning effect that decelerates the retracting piston 83 in combination with spring 128.

Figures 11, 12, 13:
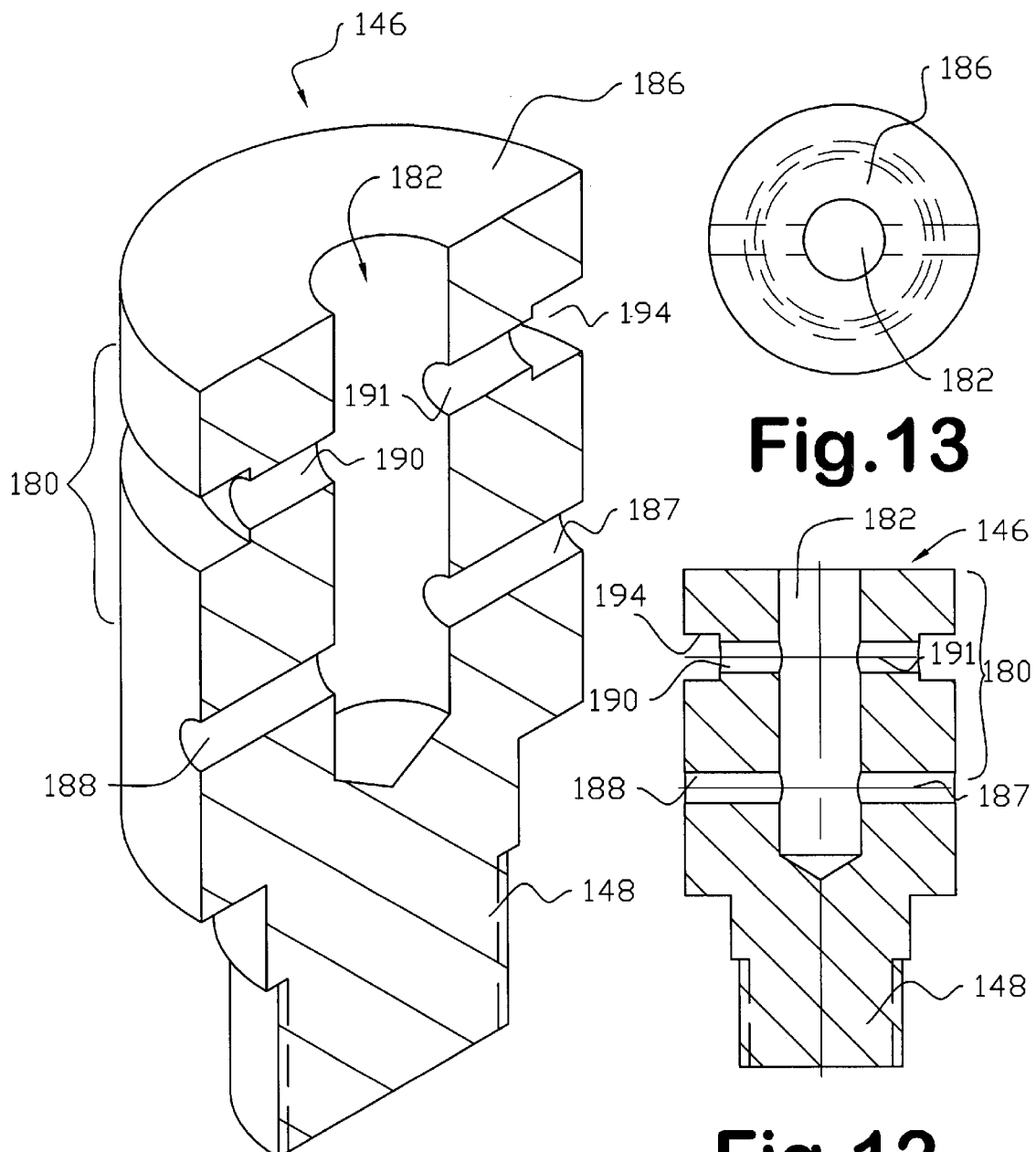
FIG. 11 is a greatly enlarged fragmentary isometric view of the preferred high temperature piston dampener.
FIG. 12 is a longitudinal sectional view of the preferred high temperature piston dampener.
FIG. 13 is a top plan view of the preferred high temperature dampener, taken from a position generally above FIG. 12.

Turning to FIGS. 11–13, dampener 146 comprises a lower diameter portion 148 previously described that is integral with an upper, generally cylindrical portion 180. Portion 180 comprises a central bore 182 that extends concentrically downwardly into the dampener interior from annular top 186. Transverse passageways 187, 188 establish fluid flow communication between the dampener exterior and bore 182. Air is controllably vented through passageways 187, 188 (FIG. 11) as the piston and dampener move upwardly and volume 129 (FIG. 5) contracts. A pair of similar transverse passageways 190, 191 (FIG. 11) establish fluid flow communication between concentric groove 194 (FIGS. 11, 12) and internal bore 182. As seen in FIG. 10, a suitable resilient O-ring 193 is seated within groove 194 in dampener 146. As the dampener forcibly moves upwardly in dampening passageway 161 (FIGS. 5, 10) compressed air within dampening passageway 161 is vented through pipe 59. Velocities between adjacent surfaces generate considerable pressures that can deform or dislodge O-ring 193. Vents 190, 191 (FIG. 11) equalize pressure on opposite sides of dampener O-ring 193 (FIG. 10) to prevent deformation and removal.

The valve actuator filling cycle is best-illustrated in FIG. 14. High-pressure air travelling through the fill pipe 59 is designated by the arrow 200. The overpressure dislodges O-ring 154 from its seat, allowing air to enter the blast tank, as indicated by arrows 202, 203.

Figure 15:
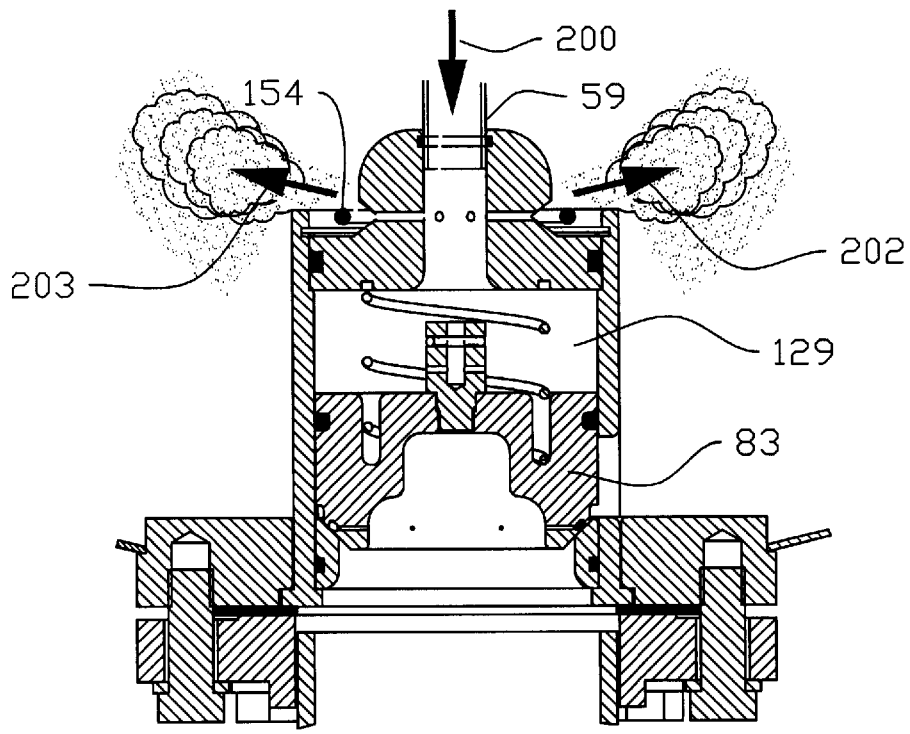
FIG. 15 is a reduced scale diagrammatic view similar to FIG. 14 showing the high temperature valve assembly disposed in a tank filling position.

To fire the aerator, fill tube 59 is depressurized or vented by the external solenoid apparatus, as indicated by arrow 206 (FIG. 15). At this time it should be noted that O-ring 154 remains seated. High pressure within the tank is exposed to the piston through vents 82. Pressure accumulated about ledge 103 (FIG. 10) is sufficient to initially dislodge piston 83 from the fill position (FIG. 15) once pipe 59 is depressurized or vented. Once air flows through the now-unblocked vents 82, as indicated by arrows 207, 208, the piston is totally retracted to the discharge position of FIG. 16. It's travel at this time is dampened as explained previously, in part by the dampener 146 sliding within dampening passageway 161 (FIG. 10). Airflow 210, 211 continues through vents 82 and pipe 66 to the intended application. Once the interior tank pressure is depleted by the blast, piston 83 returns to the fill position of FIG. 15, and the cycle repeats.

The low temperature blast aerator 21 (FIG. 17) is very similar to aerator 20 discussed above. However, it employs a low temperature valve assembly 28B with a resilient, polypropylene piston 83B instead or aluminum piston 83. The valve assembly body 56 is the same as previously described. As before, valve assembly 28B is mechanically secured to mounting flange 30. As before, a tubular fill pipe 59 (FIG. 17) extending through tank interior 24 pressurizes the valve assembly. Suitable external pneumatic solenoid control valves are employed.

With primary emphasis now on FIG. 18–21, tile low pressure actuator assembly 28B is generally cylindrical, employing the same tubular valve body 56 discussed earlier. Air accumulated in aerator 21 is discharged through vents 82 defined in the valve assembly body 56, as discussed earlier. The preferably polypropylene piston 83B is suitable for low temperature applications. It is slidably mounted within valve assembly body 56, and normally blocks vents 82 during the fill cycle. Other parts like cap 130 are assembled as before.

Piston 83B has a beveled end 98B (FIG. 18) that mates with the valve seat 85 discussed previously. Piston end 98B has a concentric ledge 103B (FIG. 18) circumscribing the piston bottom. Piston ledge 103B blocks vents 82 when in the "fill" position. High pressure air within the filled tank pressurizes piston 83B via ledge 103B Piston 831B has an upper, coaxially centered ring groove 106B (FIG. 20) that seats O-ring 108B. The annular recess 120B formed in the top 122B of piston 83B is concentric with the longitudinal axis of the piston 83B. The return spring 128 concentrically seated within recess 120B atop piston 83B Surrounding piston center portion 127B extends upwardly into mechanical contact with valve cap 130 and annular groove 135 explained earlier.

The valve actuator filling cycles illustrated in FIGS. 14 and 15 apply in this case as well. High-pressure air is delivered through the fill pipe 59, and O-ring 154 is dislodged, filling the blast aerator tank. When the till tube 59 is depressurized or vented, piston retraction exposes to vents 82, and a blast occurs as aforedescribed.

From the foregoing, it will be seen that this invention is one well adapted to obtain all the ends and objects herein set forth together with other advantages which are inherent to the structure.

It will be understood that certain features and subcombiniations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A blast aerator comprising:
   an air tank adapted to be mounted upon or adjacent a storage bin, hopper or other bulk material container;
   air inlet means adapted to be alternately connected between high pressure air for filling the tank and low pressure venting for firing the aerator;
   an actuator valve assembly disposed within said tank and connected to said air inlet means, said actuator valve assembly comprising:
      a rigid, generally tubular body having a pair of spaced apart ends, an interior, and at least one exhaust vent defined in the body;
      a valve seat coaxially disposed at one end of said body;
      a valve cap disposed at an opposite end of said body, the valve cap comprising an air control groove, an air control O-ring normally seated within said groove, and vent means connecting said air control groove to said body interior, whereby the air control O-ring functions as a valve to fill the tank;
      a piston slidably disposed within said body for movement between a sealing, tank filling position engaging said valve seat and a displaced, air discharge position unblocking said at least one exhaust vent; and,
      a return spring disposed between said piston and said valve cap for yieldably urging said piston towards said valve seat.

2. The blast aerator as defined in claim 1 wherein said valve assembly is concentrically seated within a counterbore defined in a flange mounted to said tank.

3. The blast aerator as defined in claim 1 wherein the piston comprises a tapered end that engages said valve seat, the tapered end comprising:
   an O-ring for sealing the piston,
   a concentric ring groove for seating the O-ring; and,
   a plurality of air passageways for venting the last mentioned ring groove to prevent damage to the O-ring during piston displacements.

4. The blast aerator defined in claim 3 wherein the piston comprises a concentric ledge spaced apart from said ring groove for developing displacement pressure on said piston.

5. The blast aerator defined in claim 1 wherein the piston comprises a concentric, annular recess for seating said return Spring.

6. The blast aerator as defined in claim 5 wherein the piston comprises a tapered end that engages said valve seat, the tapered end comprising:
   an O-ring for sealing the piston;
   a concentric ring groove for seating the O-ring; and,
   a plurality of air passageways for venting, the last mentioned ring groove to prevent damage to the O-ring during piston displacements.

7. The blast aerator defined in claim 6 wherein the piston comprises a concentric ledge spaced apart from said ring groove for developing displacement pressure on said piston.

8. The blast aerator defined in claim 1 wherein the valve cap comprises an annular groove for seating said return spring.

9. The blast aerator defined in claim 5 wherein the valve cap comprises a disk portion concentric with the valve actuator body, a concentric ring groove in the disk portion, and an O-ring seated within the last mentioned ring groove for sealing the cap.

10. The blast aerator a defined in claim 1 wherein the valve cap comprises a dampening passageway, and said piston comprises a generally cylindrical dampener that is received within said passageway when the piston retracts to fire the aerator.

11. The blast aerator as defined in claim 10 wherein the dampener comprises a reduced diameter threaded portion coaxially fitted to the piston.

12. The blast aerator as defined in claim 10 wherein the dampener comprises a central bore, and venting, passageway means for venting the central bore.

13. The blast aerator as defined in claim 10 wherein the dampener comprises a central bore, an upper ring groove, a dampener O-ring seated within said last mentioned ring groove, and venting passageway means for establishing fluid flow communication between the central bore and the last mentioned ring groove.

14. The blast aerator a defined in claim 1 wherein the valve cap comprises an upper, dome-like portion, an integral disk portion coaxially sealed and fitted to the valve body, and wherein said air-control ring groove is defined between the dome and disk portions.

15. A high temperature blast aerator comprising:
   an air tank adapted to be mounted upon or adjacent a storage bin, hopper or other bulk material container;
   air inlet means adapted to be alternately connected between high pressure air for filling the tank and low pressure venting for firing the aerator;
   an actuator valve assembly disposed within said tank and connected to said air inlet means, said actuator valve assembly comprising:
      a rigid, generally tubular body having a pair of spaced apart ends, an interior, and at least one exhaust vent defined in the body;
      a valve seat coaxially disposed at one end of said body;
      a valve cap disposed at an opposite end of said body, the valve cap comprising an air control groove, an air control O-ring normally seated within said groove, a dampening passageway, and vent means connecting said air control groove to said dampening passageway, whereby the air control O-ring functions as a valve to fill the tank;
      a piston slidably disposed within said body for movement between a sealing, tank filling, position engaging said valve seat and a displaced, air discharge position unblocking said at least one exhaust vent;
      a dampener secured to said piston that is received within said dampening passageway when said piston retracts; and,
      a return spring disposed between said piston and said valve cap for yieldably urging said piston towards said valve seat.

16. The blast aerator as defined in claim 15 wherein the piston comprises a tapered end that engages said valve seat, the tapered end comprising:
   an O-ring, for sealing the piston;
   a concentric ring groove for seating the O-ring; and,
   a plurality of air passageways for venting the last mentioned ring groove to prevent damage to the O-ring, during piston displacements.

17. The blast aerator defined in claim 16 wherein the piston comprises a concentric ledge spaced apart from said ring groove for developing displacement pressure on said piston.

18. The blast aerator defined in claim 10 wherein the piston comprises a concentric, annular recess for seating said return spring.

19. The blast aerator defined in claim 16 wherein the valve cap comprises a disk portion concentric with the valve actuator body, a concentric ring groove in the disk portion, and an O-ring seated within the last mentioned ring groove for sealing the cap.

20. The blast aerator as defined in claim 16 wherein the dampener comprises a reduced diameter threaded portion coaxially fitted to the piston.

21. The blast aerator as defined in claim 20 wherein the dampener comprises a central bore, and venting passageway means for venting, the central bore.

22. The blast aerator as defined in claim 20 wherein the dampener comprises a central bore, an upper ring groove, a dampener O-ring seated within said last mentioned ring groove, and venting passageway means for establishing fluid flow communication between the central bore and the last mentioned ring groove to stabilize the dampener O-ring.

23. The blast aerator a defined in claim 16 wherein the valve cap comprises an upper, domelike portion, an integral disk portion coaxially sealed and fitted to the valve body, and wherein said air-control ring, groove is defined between the dome and disk portions.

24. An actuator valve assembly foor blast aerators comprising air tanks adapted to be mounted upon or adjacent a storage bin, hopper or other bulks material container and air inlet means adapted to be alternately connected between high pressure air for filling the tank and low pressure venting for firing, the aerator said actuator valve assembly comprising:
   a rigid, generally tubular body disposed within said tank having a pair of spaced apart ends, an interior, and at least one exhaust vent defined in the body;

a valve seat coaxially disposed at one end of said body;

a valve cap disposed at an opposite end of said body, the valve cap comprising an air control groove, an air control O-ring normally seated within said groove, and vent means connecting said air control groove to said body interior, whereby the air control O-ring functions as a valve to fill the tank;

a piston slidably disposed within said body for movement between a sealing, tank filling position engaging said valve seat and a displaced, air discharge position unblocking said at least one exhaust vent; and, a return spring disposed between said piston and said valve cap for yieldably urging said piston towards said valve seat.

25. The actuator valve assembly as defined in claim 24 wherein said valve assembly is concentrically seated within a counterbore defined in a flange mounted to said tank.

26. The actuator valve assembly as defined in claim 24 wherein the piston comprises a tapered end that engages said valve seat, the tapered end comprising:

an O-ring for sealing the piston;

a concentric ring groove for seating the O-ring; and, a plurality of air passageways for venting the last mentioned ring groove to prevent damage to the O-ring, during piston displacements.

27. The actuator valve assembly defined in claim 26 wherein the piston comprises a concentric ledge spaced apart from said ring Groove for developing displacement pressure on said piston.

28. The actuator valve assembly defined in claim 24 wherein the piston comprises a concentric, annular recess for seating, said return springs.

29. The actuator valve assembly as defined in claim 28 wherein the piston comprises a tapered end that engages said valve seat, the tapered end comprising:

an O-ring for sealing the piston;

a concentric ring groove for seating the O-ring; and, a plurality of air passageways for venting the last mentioned ring groove to prevent damage to the O-ring during piston displacements.

30. The actuator valve assembly defined in claim 29 wherein the piston comprises a concentric ledge spaced apart from said ring Groove for developing displacement pressure on said piston.

31. The actuator valve assembly defined in claim 24 wherein the valve cap comprises an annular groove for seating said return spring.

32. The actuator valve assembly defined in claim 28 wherein the valve cap comprises a disk portion concentric with the valve actuator body, a concentric ring groove in the disk portion, and an O-ring seated within the last mentioned ring groove for sealing the cap.

33. The actuator valve assembly a defined in claim 24 wherein the valve cap comprises a dampening passageway, and said piston comprises a generally cylindrical dampener that is received within said passageway when the piston retracts to fire the aerator.

34. The actuator valve assembly as detained in claim 33 wherein the dampener comprises a reduced diameter threaded portion coaxially fitted to the piston.

35. The actuator valve assembly as defined in claim 33 wherein the dampener comprises a central bore, and venting passageway means for venting the central bore.

36. The actuator valve assembly as defined in claim 33 wherein the dampener comprises a central bore, an upper ring groove, a dampener O-ring seated within said last mentioned ring groove, and venting passageway means for establishing fluid flow communication between the central bore and the last mentioned ring groove.

37. The actuator valve assembly a defined in claim 24 wherein the valve cap comprises an upper, dome-like portion, an integral disk portion coaxially sealed and fitted to the valve body, and wherein said air-control ring, groove is defined between the dome and disk portions.

* * * * *